(12) United States Patent
Sutardja

(10) Patent No.: US 7,747,293 B2
(45) Date of Patent: *Jun. 29, 2010

(54) DISPLAY CONTROL FOR CELLULAR PHONE

(75) Inventor: Sehat Sutardja, Los Altos Hills, CA (US)

(73) Assignee: Marvell Worl Trade Ltd., St. Michael (BB)

( * ) Notice: Subject to any disclaimer, the term of this patent is extended or adjusted under 35 U.S.C. 154(b) by 537 days.

This patent is subject to a terminal disclaimer.

(21) Appl. No.: 11/590,936

(22) Filed: Nov. 1, 2006

(65) Prior Publication Data

US 2008/0102882 A1 May 1, 2008

Related U.S. Application Data

(60) Provisional application No. 60/829,769, filed on Oct. 17, 2006.

(51) Int. Cl.
*H04M 1/00* (2006.01)
*H04B 1/00* (2006.01)

(52) U.S. Cl. .................. 455/574; 455/127.5; 455/343.1

(58) Field of Classification Search .............. 455/127.5, 455/343.1, 418, 566, 567, 574
See application file for complete search history.

(56) References Cited

U.S. PATENT DOCUMENTS

| | | | |
|---|---|---|---|
| 6,288,628 | B1 | 9/2001 | Fujimori |
| 2004/0127198 | A1 | 7/2004 | Roskind |
| 2005/0219228 | A1 | 10/2005 | Alameh et al. |
| 2007/0156364 | A1* | 7/2007 | Rothkopf .................... 702/117 |
| 2007/0195074 | A1 | 8/2007 | Gelissen |

| | | |
|---|---|---|
| 2008/0140868 | A1 | 6/2008 Kalayjian et al. |

FOREIGN PATENT DOCUMENTS

| | | |
|---|---|---|
| EP | 1701331 A | 9/2006 |
| GB | 2403096 A | 12/2004 |
| JP | 07131511 A | 5/1995 |
| JP | 2006/025894 | 2/2006 |
| WO | WO 00/78012 A | 12/2000 |
| WO | WO2005/093552 A | 10/2005 |
| WO | WO 2005/101176 A | 10/2005 |

OTHER PUBLICATIONS

Translation for JP 7-131511, May 19, 1995.*
PCT International Search Report and Written Opinion; Mar. 10, 2008; for International Application No. PCT/US2007/022074; 14 pages.

(Continued)

*Primary Examiner*—Lee Nguyen

(57) ABSTRACT

A cellular phone comprises a transceiver that wirelessly transmits and receives wireless cellular signals, a display, an input device, a microphone that generates audio signals and a light sensing module that senses ambient light. A control module communicates with the transceiver, the display, the input device, the microphone and the light sensing module, and comprises a comparing module that generates a first signal when the ambient light signal is less than a threshold, a timing module that determines a duration of the first signal and a selecting module that communicates with the timing module and that selectively deactivates the display and the input device when the duration is greater than a first period.

30 Claims, 9 Drawing Sheets

OTHER PUBLICATIONS

PCT International Search Report and Written Opinion; Mar. 13, 2008; for International Application No. PCT/US2007/022076; 16 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 (Supplement to ANSI/IEEE Std 802.11—1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 1999; 532 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 2000; 92 pages.

802.11n; IEEE P802.11-04/0889r6; Wireless LANs, TGn Sync Proposal Technical Specification; 132 pages.

* cited by examiner

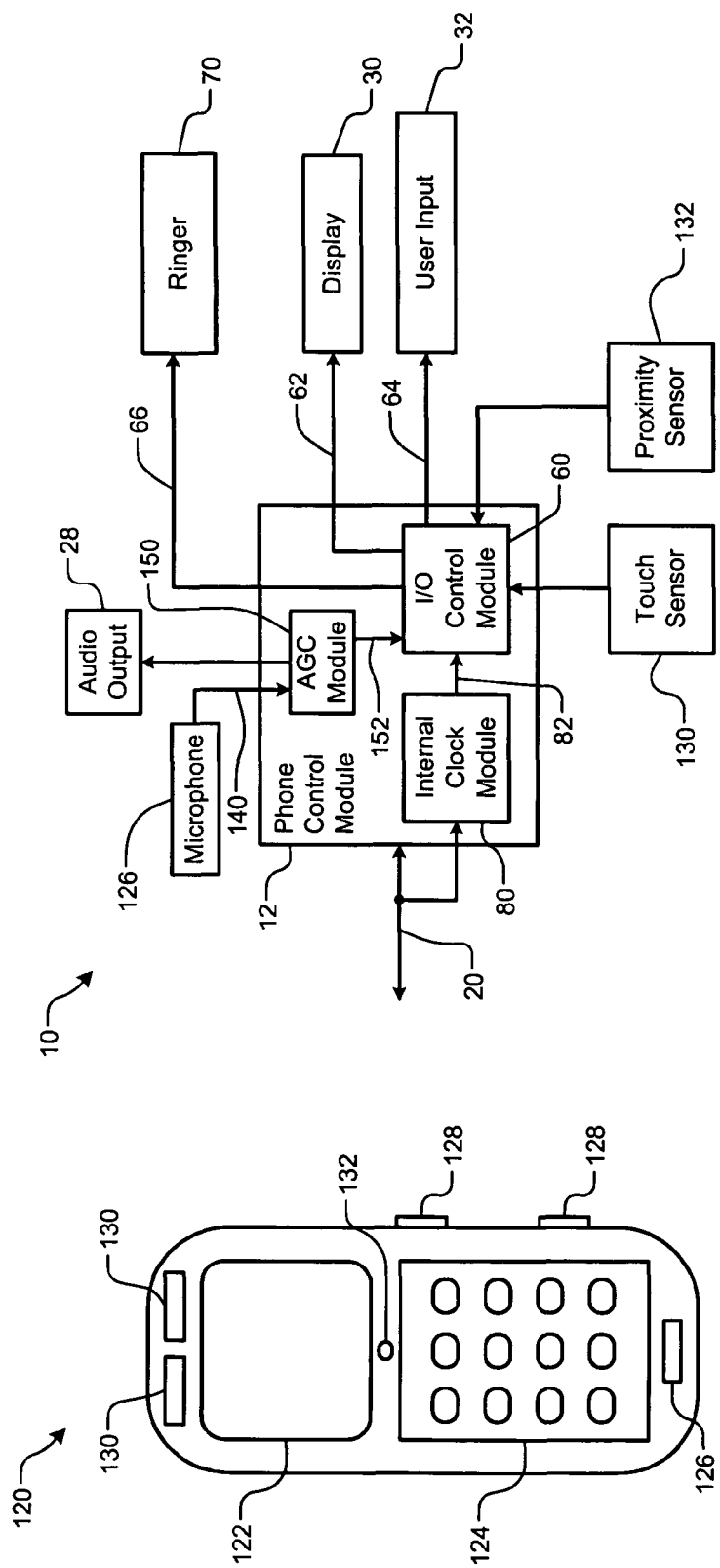

DISPLAY CONTROL FOR CELLULAR PHONE

CROSS-REFERENCE TO RELATED APPLICATIONS

This application claims the benefit of U.S. Provisional Application No. 60/829,769, filed on Oct. 17, 2006. The disclosure of the above application is incorporated herein by reference.

FIELD

The present disclosure relates to cellular phones, and more particularly to management of cellular phone displays and controls.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Generally, the size of cellular phones and other mobile devices has been reduced to improve mobility and storage while functionality has increased. For example, cellular phones may include cameras, MP3 players, personal digital assistants (PDAs), WiFi and/or other network interfaces, Bluetooth interfaces, and/or other devices. The increased functionality tends to increase the complexity of controls and user inputs of the cellular phones. Since these devices rely on battery power, low power consumption is also an important consideration.

Typically, one or more buttons for controlling the functions of the cellular phone are located on an external surface of the cellular phone. For example, buttons for initiating calls or operating an accessory such as a camera may be located on the external surface. Even clamshell-type cellular phones may have external buttons that may activate an external display or other functions of the cellular phone, even when the cellular phone is closed. The external buttons may be susceptible to inadvertent button presses. For example, users often store or transport the cellular phone in a pocket or purse. Inadvertent contact with one of the external buttons during storage may initiate a call or other function of the cellular phone, or otherwise unnecessarily consume power. Further, incidental pressure or movement during storage may also inadvertently actuate one or more unexposed buttons on a keypad of the cellular phone. For example, pressure on a top portion of a flip-type or clamshell-type phone may cause the top portion to actuate buttons on a bottom portion of the phone. These inadvertent button presses tend to increase power consumption, which reduces battery life.

SUMMARY

A cellular phone comprises a transceiver that wirelessly transmits and receives wireless cellular signals, a display, an input device, a microphone that generates audio signals and a light sensing module that senses ambient light. A control module communicates with the transceiver, the display, the input device, the microphone and the light sensing module, and comprises a comparing module that generates a first signal when the ambient light signal is less than a threshold, a timing module that determines a duration of the first signal and a selecting module that communicates with the timing module and that selectively deactivates the display and the input device when the duration is greater than a first period.

In other features, a camera module includes the light sensing module. The selecting module selectively deactivates the microphone when the duration is greater than a first period.

In other features, the selecting module disables changes to a ringer mode when the duration is greater than the first period. The selecting module changes a ringer mode when the duration is greater than the first period. The selecting module changes the ringer mode from one of an audible ringer mode, a vibration mode, and a silent mode to another of the audible ringer mode, the vibration mode, and the silent mode. The selecting module selectively deactivates the display and the input device further based on at least one of a time of day and a date. The threshold is adjusted based on at least one of a time of day and a date.

In other features, global positioning system (GPS) module that outputs a location, wherein the selecting module selectively deactivates the display and the input device further based on the location. The threshold is adjusted based on the location.

A control system for a mobile device comprises a light sensing module that generates an ambient light signal based on a sensed ambient light level. A comparing module generates a first signal when the ambient light signal is less than a threshold. A timing module determines a duration of the first signal. A selecting module communicates with the timing module and selects one of an active mode and an inactive mode of the mobile device when the duration is greater than a first period.

In other features of the invention, the selecting module selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The light sensing module includes one of a camera module and a light sensor. The selecting module prevents changes to a ringer mode when the duration is greater than the first period. The selecting module changes a ringer mode when the duration is greater than the first period. The selecting module changes the ringer mode from one of an audible ringer mode, a vibration mode, and a silent mode to another of the audible ringer mode, the vibration mode, and the silent mode. The selecting module selects the one of the active mode and the inactive mode further based on at least one of a time of day and a date. The threshold is adjusted based on at least one of a time of day and a date.

In other features of the invention, a global positioning system (GPS) module outputs a location. The selecting module selects the one of the active mode and the inactive mode further based on the location. The threshold is adjusted based on the location.

An integrated circuit for a mobile device comprises an input of the integrated circuit that receives a sensed ambient light level. A comparing module generates a first signal when the ambient light signal is less than a threshold. A timing module determines a duration of the first signal. A selecting module communicates with the timing module and selects one of an active mode and an inactive mode of the mobile device when the duration is greater than a first period.

In other features of the invention, the selecting module selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The input receives the ambient light signal from one of a camera module and a light sensor. The selecting module prevents changes to a ringer mode when the duration is greater than the first period. The selecting module changes a ringer mode when the duration is greater than the first period. The selecting module changes the ringer mode from one of an audible ringer mode, a vibration mode, and a silent mode to another of the audible ringer mode, the vibration mode, and the silent mode. The selecting module selects the one of the active mode and the inactive mode further based on at least one of a time of day and a date. The threshold is adjusted based on at least one of a time of day and a date.

In other features of the invention, a global positioning system (GPS) module outputs a location, wherein the selecting module selects the one of the active mode and the inactive mode further based on the location. The threshold is adjusted based on the location.

A control system for a mobile device comprises at least one touch sensor that generates a resistance signal based on a sensed resistance. A comparing module generates a first signal when the resistance signal is less than a threshold. A timing module determines a duration of the first signal. A selecting module communicates with the timing module and selects one of an active mode and an inactive mode of the mobile device when the duration is greater than a first period.

In other features of the invention, the selecting module selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The resistance is based on a resistance between the at least one touch sensor and a second touch sensor. The at least one touch sensor is arranged at least one of adjacent to and on an earpiece of the mobile device. The resistance signal is less than the threshold when the at least one touch sensor is in contact with an ear of a user.

A control system for a mobile device comprises a proximity sensing module that generates a proximity signal based on a sensed proximity of the mobile device to an external object. A comparing module generates a first signal when the proximity signal is less than a threshold. A timing module determines a duration of the first signal. A selecting module communicates with the timing module and selects one of an active mode and an inactive mode of the mobile device when the duration is greater than a first period.

In other features of the invention, the selecting module selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The proximity sensing module includes an infra-red (IR) device.

A control system for a mobile device comprises an audio input that generates an audio input signal. An audio amplifier amplifies the audio input signal using a gain. An adaptive gain control (AGC) module receives the audio input signal and adjusts the gain of the audio input signal. A comparing module generates a first signal when the gain is less than a threshold. A timing module determines a duration of the first signal. A selecting module communicates with the timing module and selects one of an active mode and an inactive mode of the mobile device when the duration is greater than a first period.

In other features of the invention, the selecting module selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The audio input includes a microphone. The AGC module adjusts the gain based on the audio input signal. The AGC module increases the gain when the audio input signal is greater than or equal to a second threshold and decreases the gain when the audio input signal is less than the second threshold.

A control system for a mobile device comprises light sensing means for generating an ambient light signal based on a sensed ambient light level, comparing means for generating a first signal when the ambient light signal is less than a threshold, timing means for determining a duration of the first signal, and selecting means for communicating with the timing means and for selecting one of an active mode and an inactive mode of the mobile device when the duration is greater than a first period.

In other features of the invention, the selecting means selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The light sensing means includes one of a camera module and a light sensor. The selecting means prevents changes to a ringer mode when the duration is greater than the first period.

In other features of the invention, the selecting means changes a ringer mode when the duration is greater than the first period. The selecting means changes the ringer mode from one of an audible ringer mode, a vibration mode, and a silent mode to another of the audible ringer mode, the vibration mode, and the silent mode. The selecting means selects the one of the active mode and the inactive mode further based on at least one of a time of day and a date. The threshold is adjusted based on at least one of a time of day and a date.

In other features of the invention, the control system further comprises global positioning system (GPS) means for outputting a location, wherein the selecting means selects the one of the active mode and the inactive mode further based on the location. The threshold is adjusted based on the location.

A method for operating a mobile device comprises generating an ambient light signal based on a sensed ambient light level, generating a first signal when the ambient light signal is less than a threshold, determining a duration of the first signal, and selecting one of an active mode and an inactive mode of the mobile device when the duration is greater than a first period.

In other features of the invention, selecting includes selecting the one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The method further comprises preventing changes to a ringer mode when the duration is greater than the first period. The method further comprises changing a ringer mode when the duration is greater than the first period. Changing the ringer mode includes changing the ringer mode from one of an audible ringer mode, a vibration mode, and a silent mode to another of the audible ringer mode, the vibration mode, and the silent mode. The method further comprises selecting the one of the active mode and the inactive mode further based on at least one of a time of day and a date. The method further comprises adjusting the threshold based on at least one of a time of day and a date. The method further comprises selecting the one of the active mode and the inactive mode further based on a location. The method further comprises adjusting the threshold based on the location.

A computer program stored for use by a processor for operating a mobile device comprises generating an ambient light signal based on a sensed ambient light level, generating a first signal when the ambient light signal is less than a threshold, determining a duration of the first signal, and selecting one of an active mode and an inactive mode of the mobile device when the duration is greater than a first period.

In other features of the invention, selecting includes selecting the one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The method further comprises preventing changes to a ringer mode when the duration is greater than the first period. The program further comprises changing a ringer mode when the duration is greater than the first period. Changing the ringer mode includes changing the ringer mode from one of an audible ringer mode, a vibration mode, and a silent mode to another of the audible ringer mode, the vibration mode, and the silent mode. The program further comprises selecting the one of the active mode and the inactive mode further based on at least one of a time of day and a date. The program further comprises adjusting the threshold based on at least one of a time of day and a date. The program further comprises selecting the one of the active mode and the inactive mode further based on a location. The program further comprises adjusting the threshold based on the location.

An integrated circuit for a mobile device comprises input means of the integrated circuit for receiving a sensed ambient light level, comparing means for generating a first signal when the ambient light signal is less than a threshold, timing means for determining a duration of the first signal, and selecting means for communicating with the timing module and for selecting one of an active mode and an inactive mode of the mobile device when the duration is greater than a first period.

In other features of the invention, the selecting means selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The input means receives the ambient light signal from one of a camera module and a light sensor.

In other features of the invention, the selecting means prevents changes to a ringer mode when the duration is greater than the first period. The selecting means changes a ringer mode when the duration is greater than the first period. The selecting means changes the ringer mode from one of an audible ringer mode, a vibration mode, and a silent mode to another of the audible ringer mode, the vibration mode, and the silent mode. The selecting means selects the one of the active mode and the inactive mode further based on at least one of a time of day and a date. The threshold is adjusted based on at least one of a time of day and a date.

In other features of the invention, the integrated circuit further comprises global positioning system (GPS) means for outputting a location, wherein the selecting means selects the one of the active mode and the inactive mode further based on the location. The threshold is adjusted based on the location.

A control system for a mobile device comprises at least one touch sensor means for generating a resistance signal based on a sensed resistance, comparing means for generating a first signal when the resistance signal is less than a threshold, timing means for determining a duration of the first signal, and selecting means for communicating with the timing means and for selecting one of an active mode and an inactive mode of the mobile device when the duration is greater than a first period.

In other features of the invention, the selecting means selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The resistance is based on a resistance between the at least one touch sensor and second touch sensor means. The at least one touch sensor means is arranged at least one of adjacent to and on an earpiece of the mobile device. The resistance signal is less than the threshold when the at least one touch sensor means is in contact with an ear of a user.

A method for operating a mobile device comprises generating a resistance signal based on a sensed resistance, generating a first signal when the resistance signal is less than a threshold, determining a duration of the first signal, and selecting one of an active mode and an inactive mode of the mobile device when the duration is greater than a first period.

In other features of the invention, the selecting includes selecting one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The method further comprises arranging at least one touch sensor at least one of adjacent to and on an earpiece of the mobile device and generating the resistance signal at the at least one touch sensor. The resistance signal is less than the threshold when the at least one touch sensor is in contact with an ear of a user.

A computer program stored for use by a processor for operating a mobile device comprises generating a resistance signal based on a sensed resistance, generating a first signal when the resistance signal is less than a threshold, determining a duration of the first signal, and selecting one of an active mode and an inactive mode of the mobile device when the duration is greater than a first period.

In other features of the invention, the selecting includes selecting one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The program further comprises arranging at least one touch sensor at least one of adjacent to and on an earpiece of the mobile device and generating the resistance signal at the at least one touch sensor. The resistance signal is less than the threshold when the at least one touch sensor is in contact with an ear of a user.

A control system for a mobile device comprises proximity sensing means for generating a proximity signal based on a sensed proximity of the mobile device to an external object, comparing means for generating a first signal when the proximity signal is less than a threshold, timing means for determining a duration of the first signal, and selecting means for communicating with the timing means and for selecting one of an active mode and an inactive mode of the mobile device when the duration is greater than a first period.

In other features of the invention, the selecting means selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The proximity sensing means includes an infra-red (IR) device.

A method for operating a mobile device comprises generating a proximity signal based on a sensed proximity of the mobile device to an external object, generating a first signal when the proximity signal is less than a threshold, determining a duration of the first signal, and selecting one of an active mode and an inactive mode of the mobile device when the duration is greater than a first period.

In other features of the invention, the selecting includes selecting one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC).

A computer program stored for use by a processor for operating a mobile device comprises generating a proximity signal based on a sensed proximity of the mobile device to an external object, generating a first signal when the proximity signal is less than a threshold, determining a duration of the first signal, and selecting one of an active mode and an inactive mode of the mobile device when the duration is greater than a first period.

In other features of the invention, the selecting includes selecting one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC).

A control system for a mobile device comprises audio input means for generating an audio input signal, audio amplifier means for amplifying the audio input signal using a gain, adaptive gain control (AGC) means for receiving the audio input signal and for adjusting the gain of the audio input signal, comparing means for generating a first signal when the gain is less than a threshold, timing means for determining a duration of the first signal, and selecting means for communicating with the timing means and for selecting one of an active mode and an inactive mode of the mobile device when the duration is greater than a first period.

In other features of the invention, the selecting means selects one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The audio input means includes a microphone. The AGC means adjusts the gain based on the audio input signal. The AGC means increases the gain when the audio input signal is greater than or equal to a second threshold and decreases the gain when the audio input signal is less than the second threshold.

A method for operating a mobile device comprises generating an audio input signal, amplifying the audio input signal using a gain, adjusting the gain of the audio input signal, generating a first signal when the gain is less than a threshold, determining a duration of the first signal, and selecting one of an active mode and an inactive mode of the mobile device when the duration is greater than a first period.

In other features of the invention, the selecting includes selecting one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The method further comprises increasing the gain when the audio input signal is greater than or equal to a second threshold and decreasing the gain when the audio input signal is less than the second threshold.

A computer program stored for use by a processor for operating a mobile device comprises generating an audio input signal, amplifying the audio input signal using a gain, adjusting the gain of the audio input signal, generating a first signal when the gain is less than a threshold, determining a duration of the first signal, and selecting one of an active mode and an inactive mode of the mobile device when the duration is greater than a first period.

In other features of the invention, the selecting includes selecting one of the active mode and the inactive mode of at least one of a backlight, a display, and a user input of the mobile device. The mobile device includes at least one of a cellular phone, a media player, a mobile gaming device, a personal digital assistant (PDA), and a mobile personal computer (PC). The program further comprises increasing the gain when the audio input signal is greater than or equal to a second threshold and decreasing the gain when the audio input signal is less than the second threshold.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5A is a functional block diagram of a cellular phone handset including one or more touch sensors according to the present disclosure;

FIG. 5B is a functional block diagram of a phone control module responsive to a microphone according to the present disclosure;

DETAILED DESCRIPTION

Figure 1:
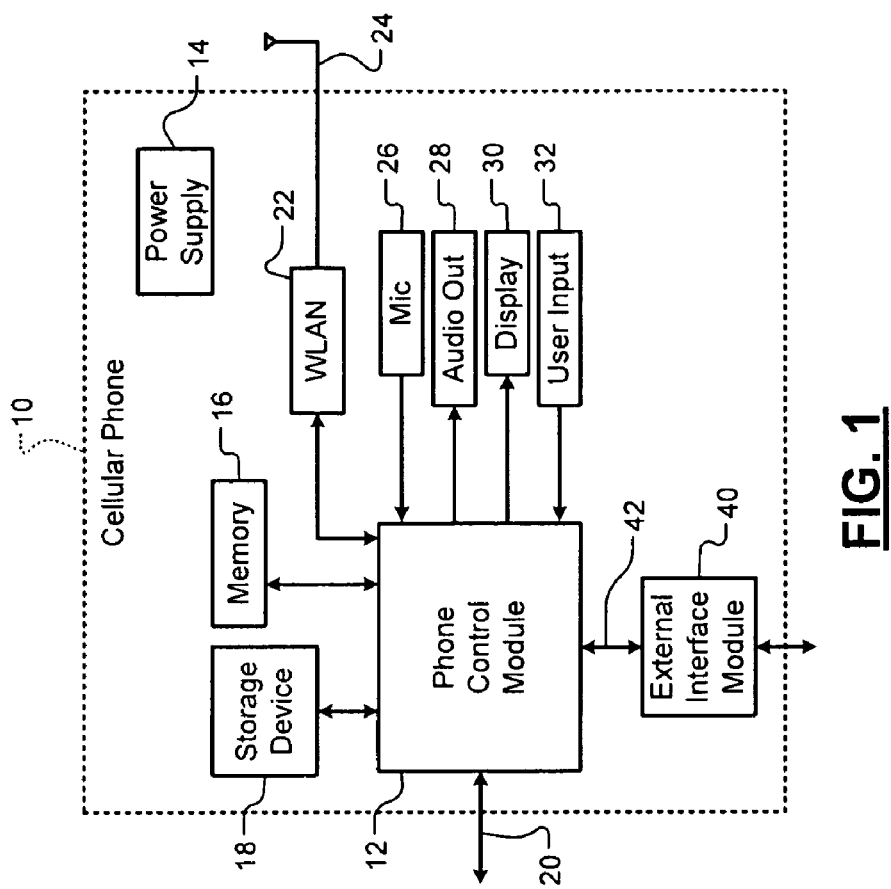
FIG. 1 is a functional block diagram of a cellular phone according to the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

An input/output control system for a cellular phone (or other mobile device) according to the present disclosure prevents inadvertent button presses from activating the lighting, display, and other functions of the cellular phone. The cellular phone may automatically disable certain functions based on environmental and external factors including, but not limited to, location of a user, time of day, and ambient light.

For example, inadvertent button presses typically occur more frequently when the cellular phone is stored in a pocket or purse. The ambient light in an enclosure such as a pocket or purse is typically less than the ambient light elsewhere. The cellular phone of the present disclosure senses the ambient light and disables button presses when the ambient light is less than a threshold. The cellular phone may disable other functions during other operating or non-operating conditions. For example, the cellular phone may disable the lighting and/or display when the user is talking on the cellular phone.

Generally, the display, including internal and external displays and display (such as LCD) and keypad backlights, consumes a significant amount of battery power. As such, preventing inadvertent button presses and display and backlight activation saves energy and increases battery life of the cellular phone.

Referring now to FIG. 1, an exemplary embodiment of a cellular phone 10 that implements the input/output control system according to the present disclosure is shown. Those skilled in the art can appreciate that other types of cellular phones may be used. The cellular phone 10 includes a phone control module 12, a power supply 14, memory 16, a storage device 18, and a cellular network interface 20. The cellular phone 10 may include a wireless interface such as a WLAN interface 22 and an associated antenna 24, a microphone 26, an audio output 28 such as a speaker and/or output jack, a display 30, and a user input device 32 such as a keypad, pointing device, voice actuation, and/or other input device. The display 30 may include both internal and external displays. For example, flip-type and clamshell-type cellular phones may include a primary internal display and a secondary external display that is visible when the cellular phone is closed.

The phone control module 12 may receive input signals from the cellular network interface 20, the WLAN interface 22, the microphone 26, and/or the user input device 32. The phone control module 12 may process signals, including encoding, decoding, filtering, and/or formatting, and generate output signals. The output signals may be communicated to one or more of the memory 16, the storage device 18, the cellular network interface 20, the WLAN interface 22, the audio output 28, and the display 30. For illustration purposes of the present embodiment, control of the display 30 may also include control of lighting of the cellular phone (e.g. backlighting of the display 30 and/or the keypad).

The memory 16 may include random access memory (RAM) and/or nonvolatile memory such as flash memory, phase change memory, or multi-state memory, in which each memory cell has more than two states. The storage device 18 may include an optical storage drive, such as a DVD drive, and/or a hard disk drive (HDD). The HDD may be a mini HDD that includes one or more platters having a diameter that is smaller than approximately 1.8". The power supply 14 provides power to the components of the cellular phone 10.

The cellular phone 10 may support connections with a WLAN via the WLAN interface 22 and/or via an additional wireless interface (not shown). The wireless interfaces may be compliant with one or more of IEEE standards including, but not limited to, 802.11, 802.11a, 802.11b, 802.11g, 802.11h, 802.11n, 802.16, 802.20, Bluetooth, EVDO (Evolution Data Optimized/Only), EDGE (Enhanced Data for GSM Evolution), and/or GPRS (General Packet Radio Service).

The phone control module 12 of the present disclosure controls one or more functions of the cellular phone 10 based on environmental and/or other external conditions including, but not limited to, ambient light, sound, and proximity. For example, the cellular phone 10 includes an external interface module 40. The external interface module 40 may include, but is not limited to, a light sensing module such as camera and/or a light sensor, a touch sensor, and a proximity sensor. The external interface module 40 senses environmental and/or other external conditions and sends a signal 42 to the phone control module 12 based on the external conditions. The phone control module 12 controls one or more functions based on the signal 42. For example, the phone control module 12 may automatically disable one or more of the microphone 26, the audio output 28, the display 30, and the user input 32 based on the signal 42. The phone control module 12 may prevent button presses from changing a ringer mode of the cellular phone 10 based on the signal.

Figure 2:
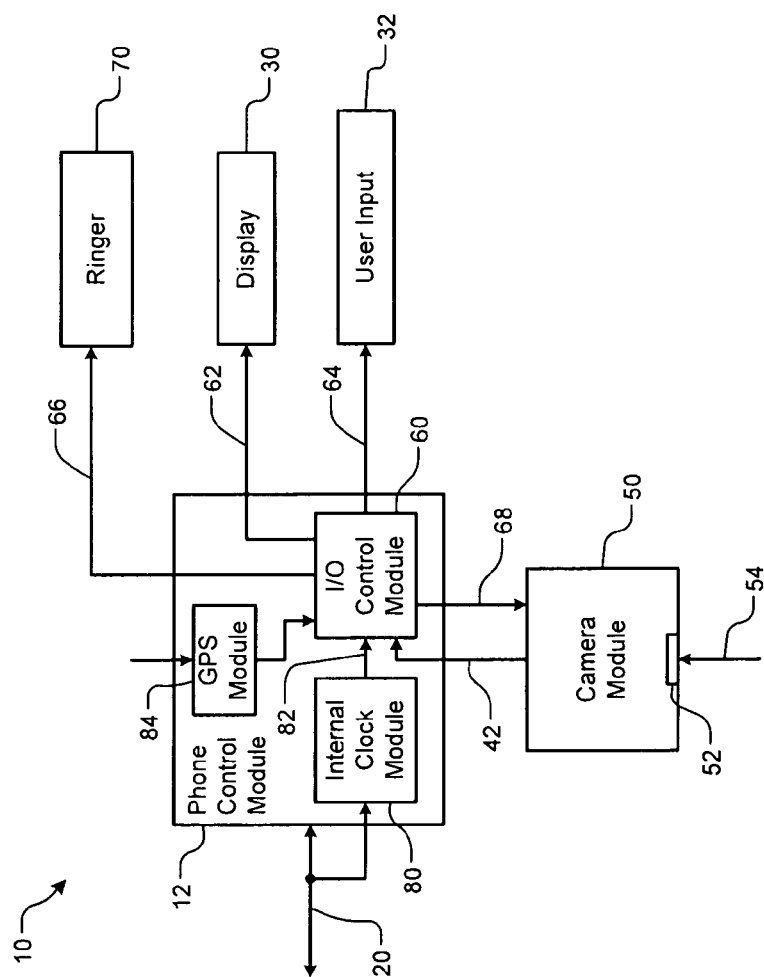
FIG. 2 is a functional block diagram of a phone control module according to the present disclosure.

Referring now to FIG. 2, an exemplary embodiment of the cellular phone 10 includes a camera module 50. The camera module 50 includes a lens 52 that is exposed to ambient light 54. The camera module 50 senses the ambient light 54 (i.e. determines a level or intensity of the ambient light 54) and generates the signal 42. In other words, the signal 42 is based on the intensity of the ambient light 54. The signal 42 may also indicate a rate of change of the intensity of the ambient light 54.

The phone control module 12 may include an input/output control module 60. The input/output control module 60 may implement or be implemented on an integrated circuit (IC) and/or a system on a chip (SOC). The input/output control module 60 receives the signal 42 and generates control signals 62, 64, 66, and 68 accordingly. For example, the input/output control module 60 may compare the intensity (or the rate of change of the intensity) of the ambient light 54 to a threshold. When the intensity is below the threshold, the input/output control module 60 modifies the operation of the cellular phone 10. The input/output control module 60 switches between active and inactive modes of various components of the cellular phone 10 in response to the signal 42. For example, the input/output control module 60 may disable the display 30 and the user input 32 in response to the signal 42. Conversely, the input/output control module 60 enables the display 30 and the user input 32 when the intensity is greater than or equal to the threshold.

In this manner, the input/output control module 60 prevents the user input 32 from activating the display 30 and/or initiating other functions of the cellular phone 10 (e.g. prevents the user input 32 from initiating a call). The input/output control module 60 also prevents the display 30, including display and keypad backlights, from repeatedly turning on without intention (e.g. in a pocket or purse). The input/output control module 60 may also disable the camera module 50 to prevent the camera module 50 from taking pictures. Alternatively (or additionally), the input/output control module 60 may disable buttons that control the camera module 50.

The cellular phone 10 includes a ringer 70. Typically, the ringer 70 includes multiple operating modes. The operating modes may include, but are not limited to, an audible ringer mode, a vibration mode, and a silent mode. A user may generally operate the ringer 70 in the audible ringer mode and switch to the vibration mode or the silent mode in certain circumstances. For example, the user may generally operate the ringer 70 in the audible mode and switch to the vibration mode or the silent mode in locations where an audible ringer is inappropriate.

The cellular phone 10 of the present disclosure may prevent inadvertent button presses from changing the operating mode of the ringer 70. For example, inadvertent button presses may change the operating mode of the ringer 70 to the silent mode when the cellular phone 10 is in a pocket or purse, preventing the user from hearing an incoming call. Conversely, inadvertent button presses may change the operating mode to the audible ringer mode in inappropriate locations. The cellular phone 10 prevents changes to the operating mode of the ringer 70 when the ambient light 54 is below the threshold.

The cellular phone 10 may also automatically change the operating mode of the ringer 70 based on the signal 42. For example, when the intensity of the ambient light 54 is less than the threshold, the input/output control module 60 automatically changes the operation mode of the ringer 70 from the audible ringer mode to one of the vibration mode and the silent mode. Conversely, when the intensity is greater than or equal to the threshold, the input/output control module 60 automatically changes the operation mode of the ringer 70 from the vibration mode or the silent mode to the audible ringer mode. In this manner, the cellular phone 10 prevents the ringer 70 from operating in the audible ringer mode in inappropriate locations.

The input/output control module 60 may wait a predetermined period after the intensity of the ambient light 54 drops below the threshold before disabling any of the functions. For example, the intensity may temporarily decrease due to other factors and not necessarily indicate that the cellular phone 10 is in a pocket or purse. As such, the input/output control module 60 may wait until the predetermined period expires before disabling any functions or otherwise altering the operation of the cellular phone 10. For example only, the period may be 5 seconds. Conversely, the input/output control module 60 may require a predetermined period of increased intensity above a threshold before returning the cellular phone 10 to normal operation.

The input/output control module 60 may also adapt the threshold according to changes in the ambient light 54. For example, the input/output control module 60 may increase the threshold when the ambient light 54 is unusually high for a period. Conversely, the input/output control module 60 may decrease the threshold when the ambient light 54 is unusually low (but not below the threshold) for a period.

The phone control module 12 may include an internal clock module 80. The internal clock module 80 generates a time signal 82 that indicates a time of day. For example, the cellular network interface 20 may continuously update the internal clock module 80 with the time of day. The input/output control module 60 receives the time signal 82 and may control the functions of the cellular phone 10 in accordance with both the signal 42 and the time signal 82. For example, after sunset the ambient light tends to be less than the ambient light during the day. As such, the input/output control module 60 may lower the threshold, or altogether forego disabling any functions of the cellular phone 10, after a certain time of day. The input/output control module 60 may take region (i.e. location of the phone/user) and/or time of year (i.e. date) into consideration when operating according to the time of day. In other words, since sunrise and sunset may vary according to region and time of year, the input/output control module 60 operates accordingly.

In certain indoor locations, the external conditions may further modify the operation of the input/output control module 60. For example, an indoor location may have ambient lighting that is less than the threshold and the input/output control module 60 may disable functions of the cellular phone 10 inadvertently (i.e. when the cellular phone 10 is not in a pocket or purse). Here, the user may program the cellular phone 10 via the user input 32 to prevent the input/output control module 60 from disabling any functions.

Alternatively, the user may enter a specific button combination at the user input 32 when the cellular phone is disabled to override the disabling characteristics of the input/output control module 60. In unlit conditions, the user may press a specific button to temporarily enable the keypad backlight, allowing the user to see and enter the button combination. Alternatively, the input/output control module 60 may automatically enable the keypad backlight for a period when a button is pressed. When the user enters the combination before the period expires, the input/output control module 60 enables all functionality of the cellular phone 10.

Conversely, an indoor location may have sufficient lighting (i.e. lighting having an intensity greater than or equal to the threshold) after sunset. Here, the input/output control module 60 may operate according to the lighting of the indoor location. For example, the input/output control module 60 may forego the time of day considerations when the ambient light is greater than or equal to the threshold for a period. Alternatively, the user may program the input/output control module 60 to forego the time of day considerations. The input/output control module 60 may automatically forego time of day considerations based on known locations. For example, the user may program known locations, such as home or office, into the input/output control module 60. The input/output control module 60 determines the location (e.g. based on a GPS module 84) and operates accordingly.

Figure 3:
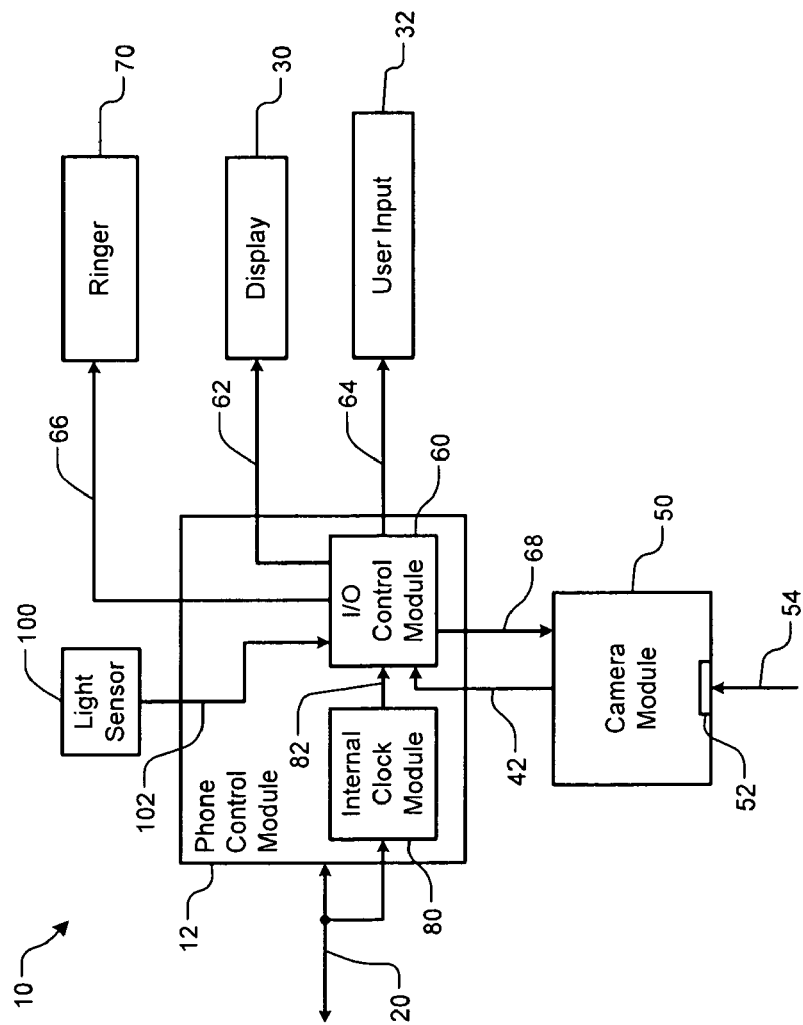
FIG. 3 is a functional block diagram of a phone control module including a light sensor according to the present disclosure.

Referring now to FIG. 3, the cellular phone 10 includes a light sensor 100. The light sensor 100 may be included instead of, or in addition to, the camera module 50. The input/output control module 60 may operate in accordance with the signal 42 and/or a signal 102 from the light sensor 100. For example, many cellular phones 10 include a cover (not shown) for the lens 52 of the camera module 50. One skilled in the art can appreciate that the cover may interfere with the operation of the input/output control module 60. The input/output control module 60 senses when the cover of the camera module 50 is closed and instead operates according to the signal 102. Alternatively, the cellular phone 10 may not include the camera module 50 and the input/output control module 60 operates solely according to the signal 102.

Figure 4:
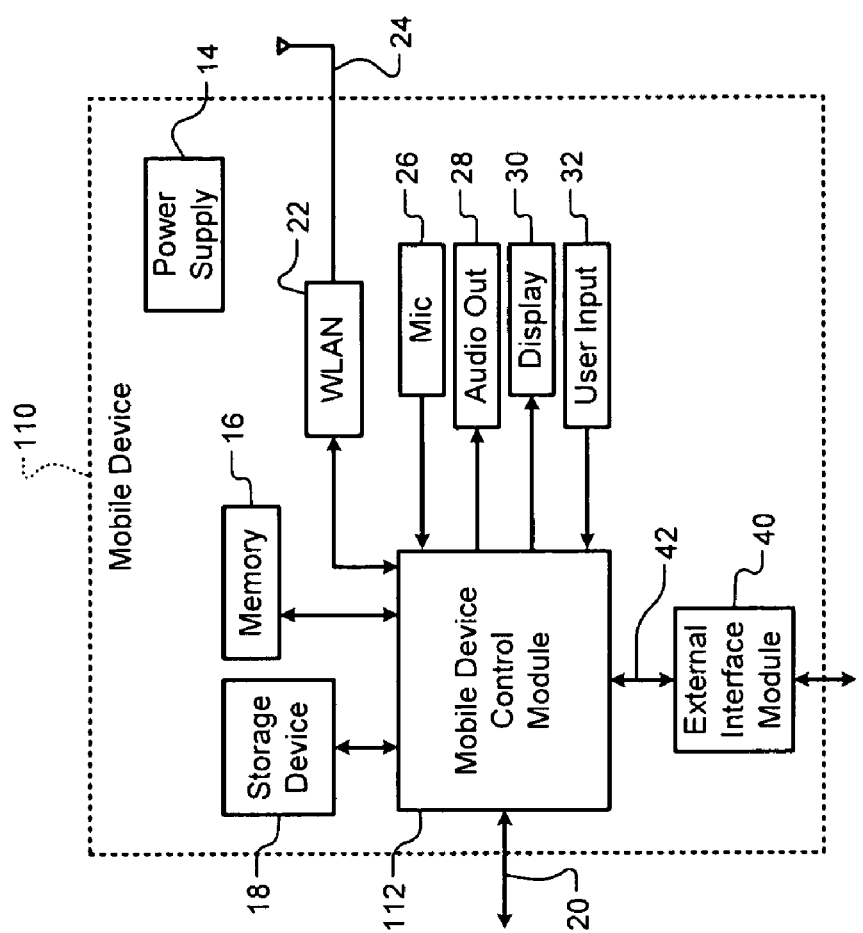
FIG. 4 is a functional block diagram of a mobile device according to the present disclosure.

Referring now to FIG. 4, an exemplary embodiment of a mobile device 110 that implements the input/output control system according to the present disclosure is shown. For example, the mobile device 110 may include, but is not limited to, a mobile gaming device, a PDA, a mobile personal computer (PC), and a media player. Those skilled in the art can appreciate that other types of mobile devices may be used. The mobile device 110 includes a mobile device control module 112. The mobile device control module 112 controls one or more functions of the mobile device 110 based on external conditions including, but not limited to, ambient light, sound, and proximity as described above with respect to FIGS. 1-3.

Referring now to FIG. 5A, a cellular phone handset 120 is shown. The cellular phone handset 120 includes a display 122, a keypad 124, a microphone 126, and one or more external buttons 128. Those skilled in the art can appreciate that other types of cellular phones may be used. For example, the present disclosure anticipates the use of flip or clamshell type cellular phone handsets. The cellular phone handset 120 may include one or more touch sensors 130 and one or more proximity sensors 132.

The cellular phone handset 120 includes the input/output control module 60 as described in FIGS. 2-4. The input/output control module 60 disables one or more functions when the user is talking on the cellular phone handset 120 (e.g. when the cellular phone handset 120 is held against the user's ear). For example, when the user is talking on the cellular phone handset 120, the user is unable to see the display 122 and/or use the keypad 124. The input/output control module 60 disables the display 122 and/or the keypad 124 when the user is talking on the cellular phone handset 120 to prevent inadvertent button press and to conserve battery power.

The touch sensors 130 sense a resistance and send a signal to the input/output control module 60 accordingly. When the resistance is less than a threshold, the input/output control module 60 may disable one or more functions of the cellular phone handset 120. For example, when the cellular phone handset 120 is not in operation, the touch sensors 130 typically do not contact any surface or object. Therefore, a resistance between the touch sensors 130 is extremely high.

In contrast, when the user is talking on the cellular phone handset 120, the touch sensors 130 may contact the ear of the user. For example, the touch sensors 130 are located in an earpiece region of the cellular phone handset 120. The user completes a circuit between the touch sensors 130. As a result, the resistance between the touch sensors 130 decreases significantly. When the resistance is less than the threshold, the input/output control module 60 disables the external buttons 128. In this manner, the input/output control module 60 prevents the user from inadvertently pressing any of the external buttons 128 while talking on the cellular phone handset 120 and/or may turn off the display 122 and any backlighting (e.g. keypad backlights) to conserve energy. Those skilled in the art can appreciate that the touch sensors 130 may be located elsewhere on the cellular phone handset 120. For example, the user may complete the circuit between the touch sensors 130 by contacting one of the touch sensors 130 with a hand and the other of the touch sensors 130 with an ear.

The input/output control module 60 may respond to input from the proximity sensor 132. The proximity sensor 132 senses when a front surface of the cellular phone handset 120 is within a predetermined distance (i.e. senses a proximity) of another object or surface. For example, the proximity sensor 132 may include an infra-red (IR) device that senses the proximity by transmitting a beam of IR light and receiving the reflected IR light. The proximity is based on an elapsed time between the transmission and reception of the IR light. When the proximity is less than the threshold, the input/output control module 60 modifies and/or disables functions of the cellular phone handset 120. In other words, when the user is talking on the cellular phone handset, the proximity sensor 132 indicates that the proximity is less than the threshold and the input/output control module 60 disables the external buttons 128 and any backlighting.

As described above, it can be understood that the resistance and/or the proximity may be driven below the thresholds as a result of temporary, intermittent contact with the touch sensors 130 and/or the proximity sensor 132, respectively. As such, the input/output control module 60 may wait for an uninterrupted minimum period (e.g. two seconds) that the resistance or proximity is less than the respective threshold before modifying or disabling any functions.

The input/output control module 60 may also control functions of the cellular phone handset 120 based on input of the microphone 126. For example, the microphone 126 senses audio input from the user and sends an appropriate signal to the input/output control module 60. The input/output control module 60 determines the proximity of the user to the microphone 126 based on the signal. When the proximity is below a threshold, the input/output control module 60 disables one or more functions of the cellular phone handset 120, including, but not limited to, the display 122, the keypad 124, and the external buttons 128. The input/output control module 60 may also disable functions of the cellular phone handset 120 when the phone control module 12 otherwise indicates that a call is in progress.

Referring now to FIG. 5B, the cellular phone 10 is shown to include the microphone 126. The microphone 126 generates a signal 140 based on user voice input. The input/output control module 60 determines a proximity of the user based on the signal 140 and disables or modifies one or more functions of the cellular phone 10 when the proximity is less than a threshold (e.g. when the user is talking on the cellular phone 10). For example, when the user is talking on the cellular phone 10, the input/output control module 60 may disable external button presses to prevent the user from inadvertently initiating an undesired function and may disable display and keypad backlighting to conserve energy.

The phone control module 12 may include an adaptive gain control (AGC) module 150. Generally, an AGC module selectively adjusts a gain of the input signal with an audio amplifier (e.g. a variable gain amplifier) based on a strength of the input signal. When the strength of the input signal is low, the AGC module increases the gain. Conversely, when the strength of the input signal is high, the AGC module decreases the gain. The AGC module 150 of the present disclosure receives the signal 140 and outputs the (gain adjusted) signal 140 to the audio output 28 accordingly. Further, the AGC module 150 generates a gain signal 152 that indicates the gain of the signal 140. The input/output control module 60 receives the gain signal 152. When the gain is less than a threshold (i.e. when the user is within a certain proximity of the microphone 126), the input/output control module 60 modifies and/or disables one or more functions of the cellular phone 10.

Figure 6:
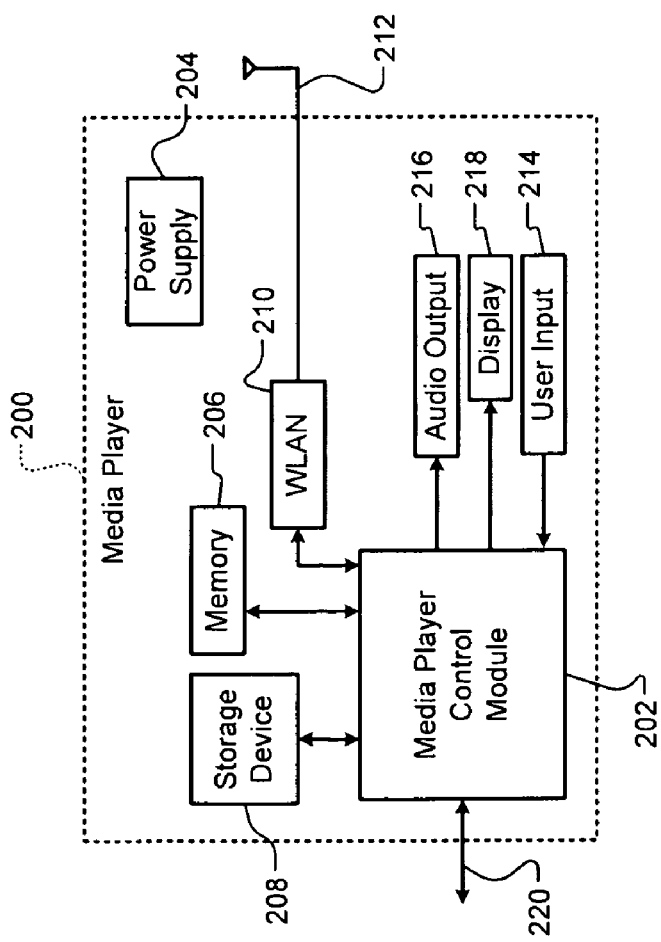
FIG. 6 is a functional block diagram of a media player according to the present disclosure.

Referring now to FIG. 6, the teachings of the disclosure can be implemented in a media player 200. The media player 200 may include a media player control module 202, a power supply 204, memory 206, a storage device 208, a WLAN interface 210 and an associated antenna 212, and an external interface module 220.

The media player control module 202 may receive input signals from the WLAN interface 210 and/or the external interface module 220. The external interface module 220 may include USB, infrared, and/or Ethernet. The input signals may include compressed audio and/or video, and may be compliant with the MP3 format. Additionally, the media player control module 202 may receive input from a user input 214 such as a keypad, touchpad, or individual buttons. The media player control module 202 may process input signals, including encoding, decoding, filtering, and/or formatting, and generate output signals.

The media player control module 202 may output audio signals to an audio output 216 and video signals to a display 218. The audio output 216 may include a speaker and/or an output jack. The display 218 may present a graphical user interface, which may include menus, icons, etc. The power supply 204 provides power to the components of the media player 200. Memory 206 may include random access memory (RAM) and/or nonvolatile memory such as flash memory, phase change memory, or multi-state memory, in which each memory cell has more than two states. The storage device 208 may include an optical storage drive, such as a DVD drive, and/or a hard disk drive (HDD).

Figure 7:
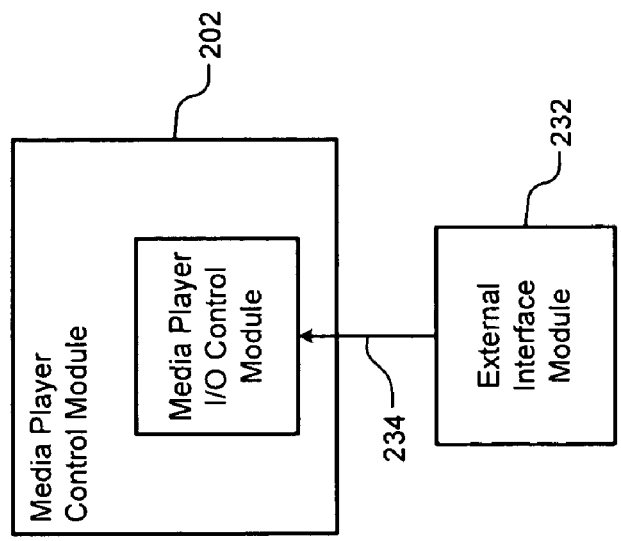
FIG. 7 is a functional block diagram of a media player control module according to the present disclosure.

Referring now to FIG. 7, the media player control module 202 includes a media player input/output control module 230. The media player input/output control module 230 communicates with an external interface module 232 such as a light sensor, touch sensor, camera, and/or microphone via a signal 234. When the signal 234 indicates that external conditions meet certain criteria, the media player input/output control module 230 disables or modifies the operation of one or more of the user input 214, the display 218, and the audio output 216.

Figure 8:
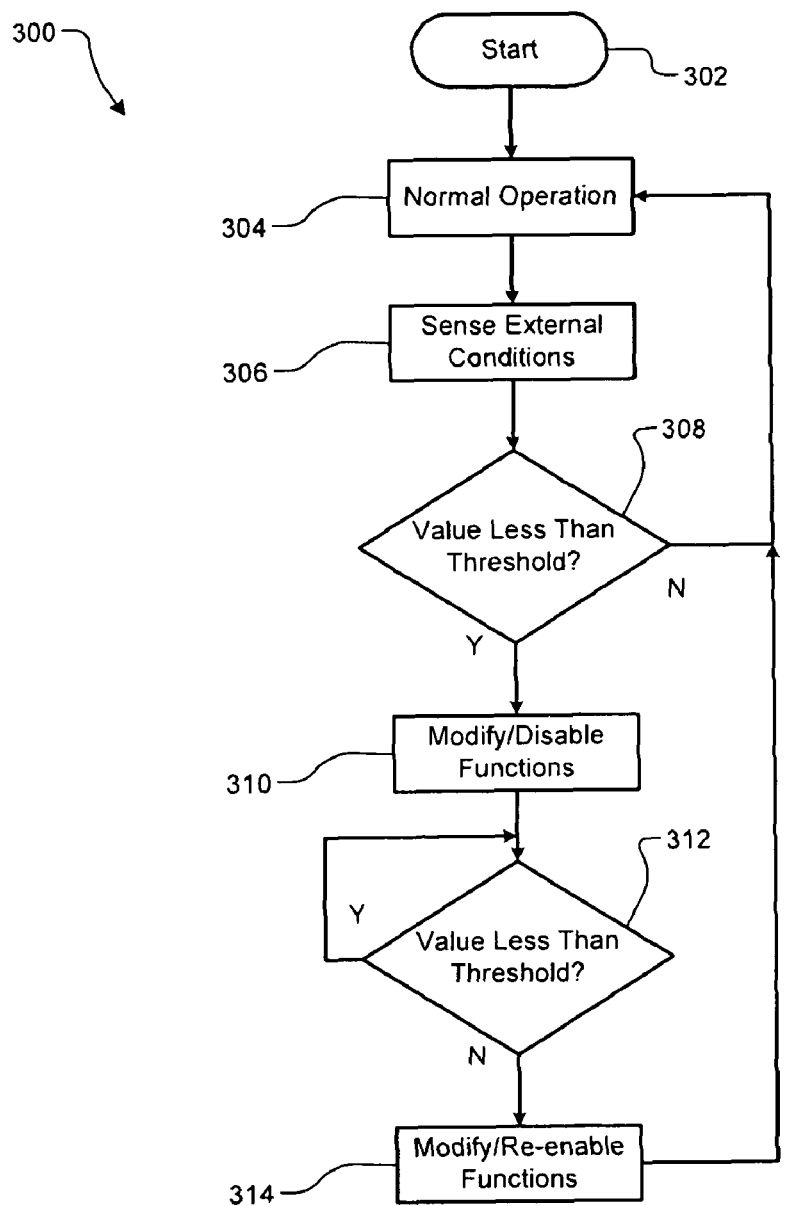
FIG. 8 is a flow diagram that illustrates steps of a method for operating a cellular phone according to the present disclosure.

Referring now to FIG. 8, an input/output control method 300 of a mobile device according to the present disclosure begins in step 302. In step 304, the mobile device begins normal operation (e.g. the mobile device is turned on). In step 306, an external interface module senses one or more external conditions, such as a level of ambient light, resistance, and/or proximity. In step 308, an input/output control module determines whether a value of the external condition is less than a threshold. If true, the method 300 continues to step 310. If false, the method 300 continues to step 304 and continues normal operation.

In step 310, the input/output control module modifies or disables one or more operations of the mobile device. In step 312, the input/output control module determines whether the value of the external condition is still less than the threshold. If true, the method 300 repeats step 312. If false, the method continues to step 314. In step 314, the input/output control module modifies the operation of the mobile device (e.g. re-enables any disabled functions) and continues to step 304. In other words, the input/output control module modifies the operations of the mobile device until the value of the external condition is greater than or equal to the threshold.

Figure 9:
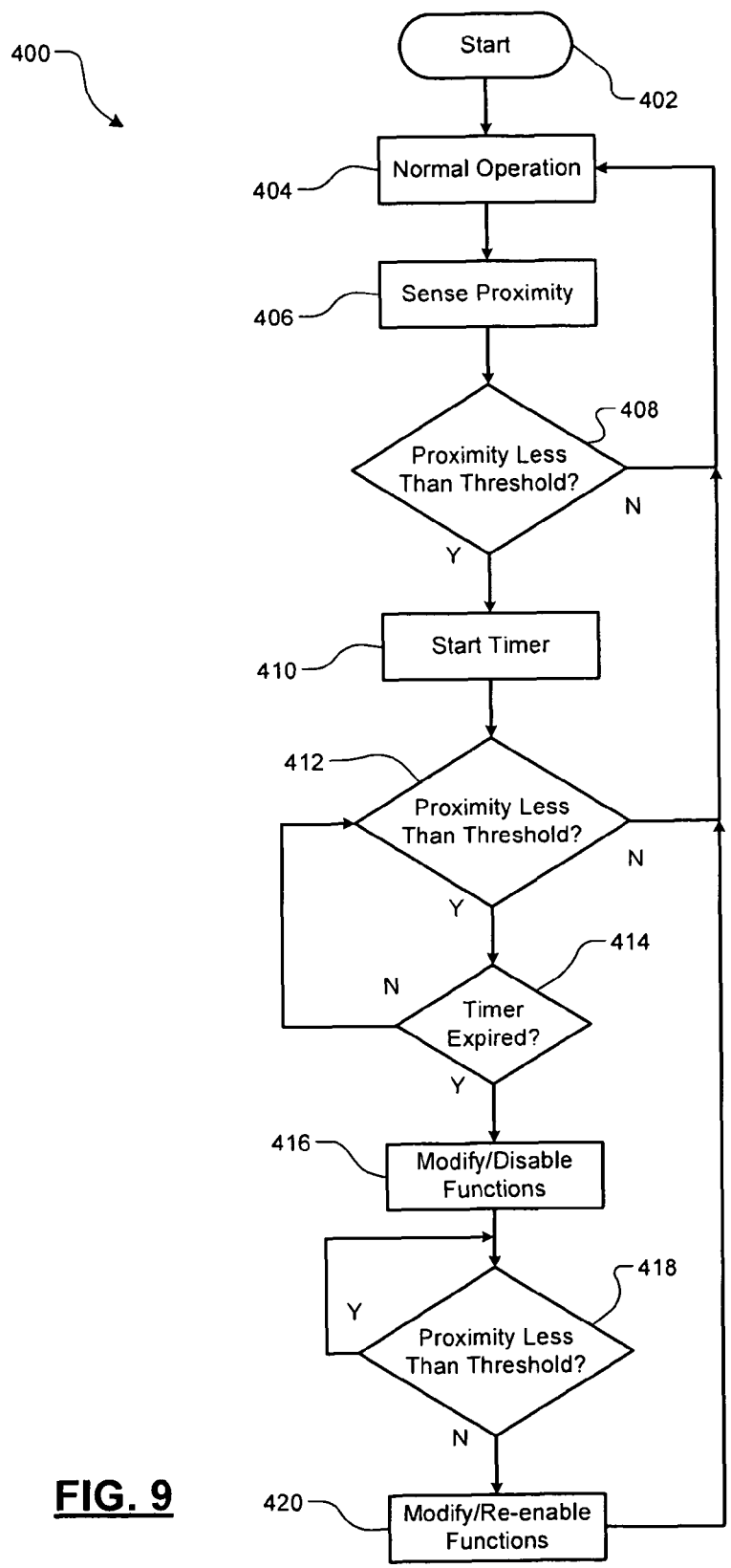
FIG. 9 is a flow diagram that illustrates steps of a method for operating a cellular phone according to the present disclosure.

Referring now to FIG. 9, a proximity-based input/output control method 400 of a mobile device begins in step 402. In step 404, the mobile device begins normal operation (e.g. the mobile device is turned on). In step 406, the mobile device senses proximity. For example, the mobile device senses the proximity based on at least one of a resistance between touch sensors, an IR signal of a proximity sensor, and a gain of an input signal. In step 408, the mobile device determines whether the proximity is less than a threshold. If true, the method 400 continues to step 410. If false, the method 400 continues to step 404 and continues normal operation.

In step 410, the mobile device starts a timer. In step 412, the mobile device determines whether the proximity is still less than the threshold. If true, the method 400 continues to step 414. If false, the method 400 continues to step 404 and continues normal operation. In step 414, the mobile device determines whether the timer is expired (i.e. exceeds a threshold period). If true, the method 400 continues to step 416. If false, the method 400 continues to step 412. In other words, in steps 410 through 414, the method 400 determines whether the proximity is less than the threshold for an uninterrupted minimum period of time (e.g. two seconds).

In step 416, one or more operations of the mobile device are disabled. In step 418, the mobile device determines whether the value of the proximity is still less than the threshold. If true, the method 400 repeats step 418. If false, the method 400 continues to step 420. In step 420, the operation of the mobile device is modified (e.g. any disabled functions are re-enabled) and the method 400 continues to step 404. In other words, the operations of the mobile device are modified until the proximity is greater than or equal to the threshold.

Figure 10:
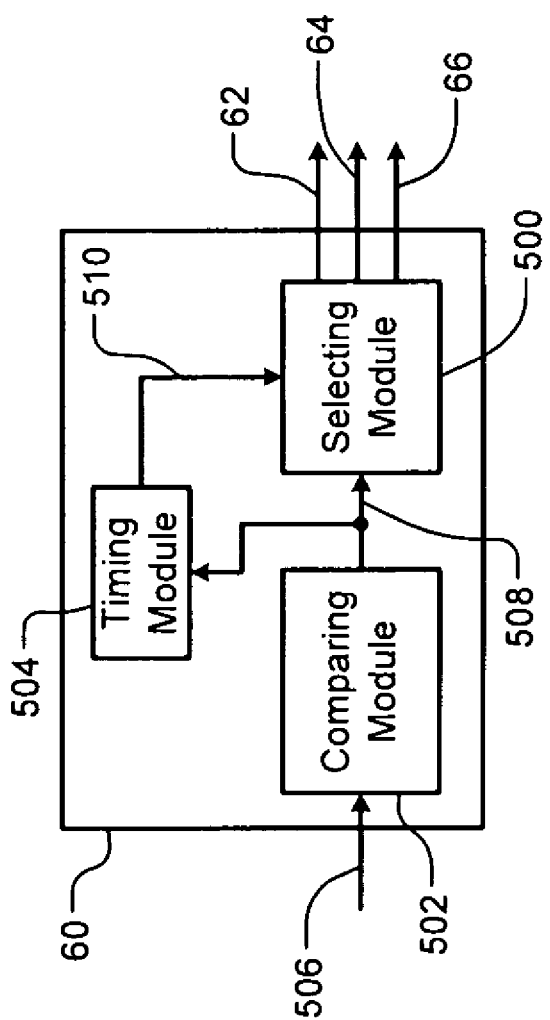
FIG. 10 is a functional block diagram of an input/output control module according to the present disclosure.

Referring now to FIG. 10, an exemplary implementation of the input/output control module 60 is shown. The input/output control module 60 includes a selecting module 500, a comparing module 502, and a timing module 504. The comparing module 502 receives a signal 506. The signal 506 is based on one or more sensed external conditions including, but not limited to, a sensed ambient light level, a sensed resistance, a sensed proximity, and a gain as described in FIGS. 1-7.

The comparing module 502 compares the signal 506 to a threshold and generates a signal 508 when the signal 506 is less than the threshold. The selecting module 500 receives the signal 508 and a signal 510 from the timing module 504. The timing module 504 determines a duration that the signal 506 is less than the threshold. The signal 510 represents the duration. When the duration is greater than a period, the selecting module 500 selects active and inactive modes of various components of a mobile device accordingly. For example, the selecting module selects the active and inactive modes via signals 62, 64, and 66 as described in FIG. 2.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A cellular phone, comprising:
   a transceiver to wirelessly transmit and receive wireless cellular signals;
   a display;
   an input device;
   a microphone to generate audio signals;
   a light sensing module to sense ambient light; and
   a control module to communicate with the transceiver, the display, the input device, the microphone and the light sensing module, the control module comprising:
   a comparing module to generate a first signal when the ambient light signal is less than a threshold;

a timing module to determine a duration of the first signal; and a selecting module to communicate with the timing module, to selectively deactivate the display and input functions of the input device when the duration is greater than a first period, and to disable changes to a ringer mode when the duration is greater than the first period.

2. The cellular phone of claim 1 further comprising a camera module that includes the light sensing module.

3. The cellular phone of claim 1, wherein the selecting module selectively deactivates the microphone when the duration is greater than a first period.

4. The cellular phone of claim 3, wherein the selecting module selectively deactivates the display and the input device and disables changes to the ringer mode further based on at least one of a time of day and a date.

5. The cellular phone of claim 3, wherein the threshold is adjusted based on at least one of a time of day and a date.

6. The cellular phone of claim 3 further comprising a global positioning system (GPS) module to output a location of the cellular phone, wherein the selecting module selectively deactivates the display and the input device further based on the location.

7. The cellular phone of claim 6, wherein the threshold is adjusted based on the location.

8. A control system for a mobile device, comprising:
a light sensing module to generate an ambient light signal based on a sensed ambient light level;
a comparing module to generate a first signal when the ambient light signal is less than a threshold;
a timing module to determine a duration of the first signal; and
a selecting module to communicate with the timing module, to select one of an active mode and an inactive mode of the mobile device when the duration is greater than a first period, wherein input functions of a user input are disabled in the inactive mode, and to prevent changes to a ringer mode when the duration is greater than the first period.

9. The control system of claim 8, wherein the selecting module selects the one of the active mode and the inactive mode of at least one of a backlight and a display of the mobile device.

10. The control system of claim 8, wherein the mobile device includes at least one of a cellular phone, a media player, a mobile gaming device, a personal digital assistant (PDA), and a mobile personal computer (PC).

11. The control system of claim 8, wherein the light sensing module includes one of a camera module and a light sensor.

12. The control system of claim 8, wherein the selecting module selects the one of the active mode and the inactive mode and prevents changes to the ringer mode further based on at least one of a time of day and a date.

13. The control system of claim 8, wherein the threshold is adjusted based on at least one of a time of day and a date.

14. The control system of claim 8 further comprising a global positioning system (GPS) module to output a location, wherein the selecting module selects the one of the active mode and the inactive mode further based on the location.

15. The control system of claim 14, wherein the threshold is adjusted based on the location.

16. An integrated circuit for a mobile device, comprising:
an input of the integrated circuit to receive a sensed ambient light level;
a comparing module to generate a first signal when the ambient light signal is less than a threshold;
a timing module to determine a duration of the first signal; and
a selecting module to communicate with the timing module, to select one of an active mode and an inactive mode of the mobile device when the duration is greater than a first period, wherein input functions of a user input are disabled in the inactive mode and to prevent changes to a ringer mode when the duration is greater than the first period.

17. The integrated circuit of claim 16, wherein the selecting module selects the one of the active mode and the inactive mode of at least one of a backlight and a display of the mobile device.

18. The integrated circuit of claim 16, wherein the mobile device includes at least one of a cellular phone, a media player, a mobile gaming device, a personal digital assistant (PDA), and a mobile personal computer (PC).

19. The integrated circuit of claim 16, wherein the input receives the ambient light signal from one of a camera module and a light sensor.

20. The integrated circuit of claim 16, wherein the selecting module selects the one of the active mode and the inactive mode and prevents changes to the ringer mode further based on at least one of a time of day and a date.

21. The integrated circuit of claim 16, wherein the threshold is adjusted based on at least one of a time of day and a date.

22. The integrated circuit of claim 16 further comprising a global positioning system (GPS) module to output a location, wherein the selecting module selects the one of the active mode and the inactive mode further based on the location.

23. The integrated circuit of claim 22, wherein the threshold is adjusted based on the location.

24. A method for operating a mobile device, comprising:
receiving an ambient light signal based on a sensed ambient light level that is generated using a light sensing module of the mobile device;
generating a first signal when the ambient light signal is less than a threshold;
determining a duration of the first signal;
selecting one of an active mode and an inactive mode of the mobile device when the duration is greater than a first period using a selecting module of the mobile device, wherein input functions of a user input are disabled in the inactive mode; and
preventing changes to a ringer mode when the duration is greater than the first period.

25. The method of claim 24, wherein selecting includes selecting the one of the active mode and the inactive mode of at least one of a backlight and a display of the mobile device.

26. The method of claim 24, wherein the mobile device includes at least one of a cellular phone, a media player, a mobile gaming device, a personal digital assistant (PDA), and a mobile personal computer (PC).

27. The method of claim 24 further comprising selecting the one of the active mode and the inactive mode and preventing changes to the ringer mode further based on at least one of a time of day and a date.

28. The method of claim 24, further comprising adjusting the threshold based on at least one of a time of day and a date.

29. The method of claim 24 further comprising selecting the one of the active mode and the inactive mode further based on a location.

30. The method of claim 29 further comprising adjusting the threshold based on the location.

* * * * *